Dec. 7, 1965   O. C. NORTON   3,221,478
GAS DRIER
Filed Oct. 2, 1961

INVENTOR.
ORLO CLAIR NORTON
BY
Charles L. Lovercheck
attorney

United States Patent Office 3,221,478
Patented Dec. 7, 1965

3,221,478
GAS DRIER
Orlo Clair Norton, Erie, Pa., assignor to Van Products
Company, Erie, Pa., a corporation of Pennsylvania
Filed Oct. 2, 1961, Ser. No. 142,423
2 Claims. (Cl. 55—281)

This application is a continuation-in-part of patent application, Serial No. 801,908, filed March 25, 1959 and now abandoned.

This invention relates to gas driers and, more particularly, to devices for removing moisture from air and gases.

In the said application, an air drier is shown having a sponge rubber sheet to support a desiccant in the path of the air. In the present application, a sponge rubber sheet is also shown for supporting a desiccant in an air drier; however, the sponge rubber in the present application is disposed in such a manner as to provide an erratic path between the sponge rubber and the walls of the drier. The sponge rubber will become saturated with a solution of desiccant and water and air passing between the walls of the drier and the sponge rubber will come in contact with the desiccant solution on the sponge rubber and give up the moisture entrained in the air. The solution of desiccant percolating through the sponge rubber will thus be diluted by the moisture from the air and will flow to the bottom of the tank.

In driers using pure calcium chloride for a desiccant, the calcium chloride tends to form lumps when coming in contact with moist gas. Ultimately, this desiccant will solidify so that no gas can pass through the bed of it. Various ways of coping with this problem have been suggested; however, all of these involve complicated expensive equipment. In the present invention, a device is provided wherein the undissolved desiccant itself is kept out of contact with the moist air and a solution of the desiccant is constantly held in contact with the moist air.

It is, accordingly, an object of the present invention to provide an improved gas drier.

Another object of the invention is to provide a gas drier which is simple in construction, economical to manufacture, and simple and efficient to use.

A further object of the invention is to provide a gas drier wherein a hygroscopic desiccant is supported inside a sponge container and air is passed between the container and the sponge.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

Figure 1:
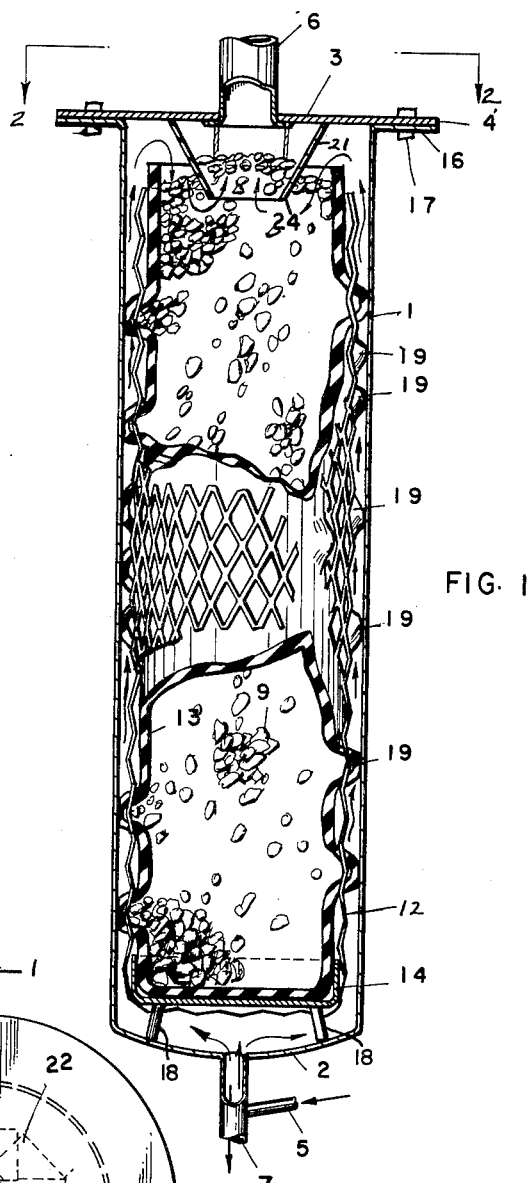
FIG. 1 is a cross sectional view taken on line 1—1 of FIG. 2.
Figure 2:
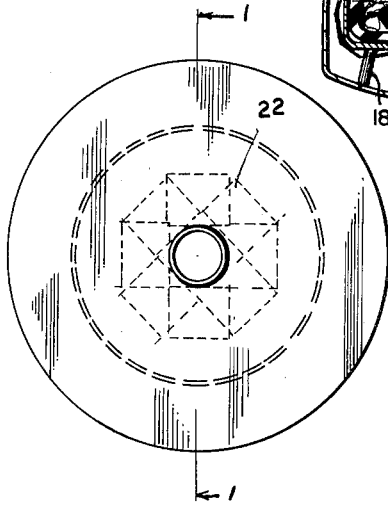
FIG. 2 is a top view of the gas drier taken on line 2—2 of FIG. 1.

Now with more particular reference to the drawing, the gas drier shown has a tank 1 having a bottom 2 and a closed cover 3 attached to a flange 16 of the tank by means of bolts 17. This cover can be removed to replenish the desiccant in the tank.

The tank cover 3 is sealed by a suitable gasket 4 and has an inlet 5 and an outlet 6 for air or gas to be dried. The outlet 6 is connected to a drain 7 through which liquid water in solution with the desiccant can be drained off, either through an automatic venting valve or into a suitable sump. A timed valve could be used to control the drain valve.

The tank 1 has a support for a sponge cylinder 13 which may be in the form of a cup like container 14 which rests on legs 18 which are in turn supported on the bottom 2 of the tank 1.

An inside basket 12 may be made of coarse mesh screen or expanded metal or of a plastic cup having openings therein large enough to let the sponge cylinder 13 bulge out into engagement with the tank as shown. The basket may be in the shape of a hollow cylinder closed at the bottom or it could be open at the bottom and attached around its edges to the rim of the cup like container 14.

The sponge like cylinder 13 may be made of sponge plastic or sponge rubber or it could even be made of a material such as natural sponge or any other suitable material. It could, in certain cases, be made of sponge like materials such as heavy cloth or canvas. It is in the shape of a bag generally cylindrical and closed at the bottom resting on the container 14 at the bottom and having its sides restrained by the basket 12.

The sponge cylinder 13 is forced outward through the mesh of the expanded metal shown and protrusions 19 engage the inner periphery of the tank. Thus, the protrusions 19 form obstructions to the flow of air and the air has to flow around them in the spaces between the sponge cylinder and tank and it flows from the bottom up around between the basket and the inside of the tank and between the protrusions 19, thereby forming a tortuous path that the air must follow.

Desiccant material 9 may be calcium chloride or any other suitable hygroscopic material, preferably in granular form or in lump form so that it can be replenished through the top of the tank when the cover is removed.

In use, the cover 3 is removed and a quantity of desiccant material 9 is placed therein such as calcium chloride. A quantity of water is poured into the desiccant to form a solution therewith which will percolate through the sponge. The cover is then replaced and sealed in place. The air is then turned on at the inlet 5 and it flows up through the tortuous path between the sponge cylinder 13 and the inside of the tank 1 and the hygroscopic solution on the surface of the sponge cylinder 13 comes in contact with the air and absorbs water therefrom. The water in the form of a dilute solution then drips down into the bottom of the tank and flows out through the drain 7 and this process continues until the desiccant material 9 is depleted. Then an additional quantity of desiccant must be placed in the sponge cylinder. Because of flow by percolation of the liquid through the sponge, the liquid tends to be equalized, making the dissolving of the desiccant continuous and uniform.

Baffle plates 21 are attached to the top of the tank and extend downwardly. Spaces 22 are provided between the ends of the baffle plates so that the air will normally flow up around the bottoms of the baffle plates through the top of the desiccant as shown by the arrows but if the liquid should arise above the lower ends 24 of the baffle plates, the air will flow between the corners thereof.

The foregoing specification sets forth the invention in in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. An air drier comprising
   a tank having an inlet adjacent the bottom, an outlet adjacent the top, and drain means in said tank adjacent the bottom,
   a screen like basket in said tank,
   said basket having a wall with apertures in it, said wall being generally concentric to the inside surface of said tank and spaced inwardly from said inside surface on all sides of said tank so as to define a flow path between said basket and said tank between said inlet and said outlet, a sponge like container in said basket, said sponge like container protruding through said apertures in said basket into said flow path, and a hygroscopic desiccant in said container, said desiccant being adapted to form a solution with water which will flow by percolation through said container into engagement with air flowing through said flow path.

2. The air drier recited in claim 1 wherein said basket is supported in said tank by a cup shaped container having legs thereon supported on the bottom of said tank, said cup shaped container receiving the bottom of said sponge like container and supporting it out of engagement with the bottom of said tank.

References Cited by the Examiner
UNITED STATES PATENTS

| | | | |
|---|---|---|---|
| 1,965,461 | 7/1934 | Gray | 55—387 X |
| 2,174,186 | 9/1939 | Downs et al. | 55—163 |
| 2,195,565 | 4/1940 | Fricke | 55—387 X |
| 2,243,949 | 6/1941 | Fox. | |
| 2,341,893 | 2/1944 | Baker | 55—281 |
| 2,536,274 | 1/1951 | Gaugler | 55—387 X |
| 3,090,490 | 5/1963 | Yocum | 55—387 X |

HARRY B. THORNTON, *Primary Examiner.*

HERBERT L. MARTIN, *Examiner.*